US009699224B2

United States Patent
Taylor

(10) Patent No.: US 9,699,224 B2
(45) Date of Patent: Jul. 4, 2017

(54) LINKING WEB SESSIONS WITH TELEPHONE CALLS

(71) Applicant: Metaswitch Networks Limited, Enfield, Middlesex (GB)

(72) Inventor: Martin Taylor, Enfield (GB)

(73) Assignee: Metaswitch Networks Limited, Enfield, Middlesex (GB)

( * ) Notice: Subject to any disclaimer, the term of this patent is extended or adjusted under 35 U.S.C. 154(b) by 74 days.

(21) Appl. No.: 14/466,553

(22) Filed: Aug. 22, 2014

(65) Prior Publication Data

US 2015/0063172 A1 Mar. 5, 2015

(51) Int. Cl.
| | |
|---|---|
| H04L 29/06 | (2006.01) |
| H04L 29/08 | (2006.01) |
| H04N 7/00 | (2011.01) |
| H04M 7/00 | (2006.01) |

(52) U.S. Cl.
CPC ...... *H04L 65/1069* (2013.01); *H04L 65/1033* (2013.01); *H04L 65/1046* (2013.01); *H04L 65/1096* (2013.01); *H04L 65/4015* (2013.01); *H04L 65/4023* (2013.01); *H04L 65/608* (2013.01); *H04L 67/02* (2013.01); *H04M 7/003* (2013.01)

(58) Field of Classification Search
CPC ............ H04M 1/2535; H04M 3/5191; H04M 3/42102; H04M 3/42195; H04M 3/5231; H04M 3/4938; H04M 2207/20; H04M 2207/40; H04M 7/0003; H04M 7/0027; H04M 7/1205
See application file for complete search history.

(56) References Cited

U.S. PATENT DOCUMENTS

| | | | |
|---|---|---|---|
| 2003/0208358 A1 | 11/2003 | Andaker et al. | |
| 2005/0073999 A1* | 4/2005 | Koch | H04L 12/1859 370/352 |
| 2007/0005776 A1 | 1/2007 | Hansen et al. | |
| 2012/0324375 A1 | 12/2012 | Mathews | |
| 2014/0126714 A1* | 5/2014 | Sayko | H04M 3/5191 379/265.09 |
| 2014/0293832 A1* | 10/2014 | Parikh | H04M 15/57 370/259 |
| 2015/0039775 A1* | 2/2015 | Benner | H04L 65/1006 709/228 |
| 2015/0106528 A1* | 4/2015 | Somes | H04L 67/141 709/228 |
| 2015/0229635 A1* | 8/2015 | Saridaki | H04L 65/1006 726/8 |

FOREIGN PATENT DOCUMENTS

| | | |
|---|---|---|
| GB | 2476121 A | 6/2011 |
| WO | WO2014019497 A1 | 2/2014 |

* cited by examiner

*Primary Examiner* — Yemane Mesfin
*Assistant Examiner* — Peter Chen
(74) *Attorney, Agent, or Firm* — Stetina Brunda Garred & Brucker

(57) ABSTRACT

A web application assigns a number that resembles a conventional telephone number and that uniquely identifies the current Web session, and injects this number into a signalling message or signalling messages that flow towards a WebRTC gateway. The WebRTC gateway inserts this number into the signalling information element that conveys Caller ID in the signalling message that it sends into the telephone network. This allows the recipient of a WebRTC call to identify the web session from which the WebRTC call originates.

15 Claims, 1 Drawing Sheet

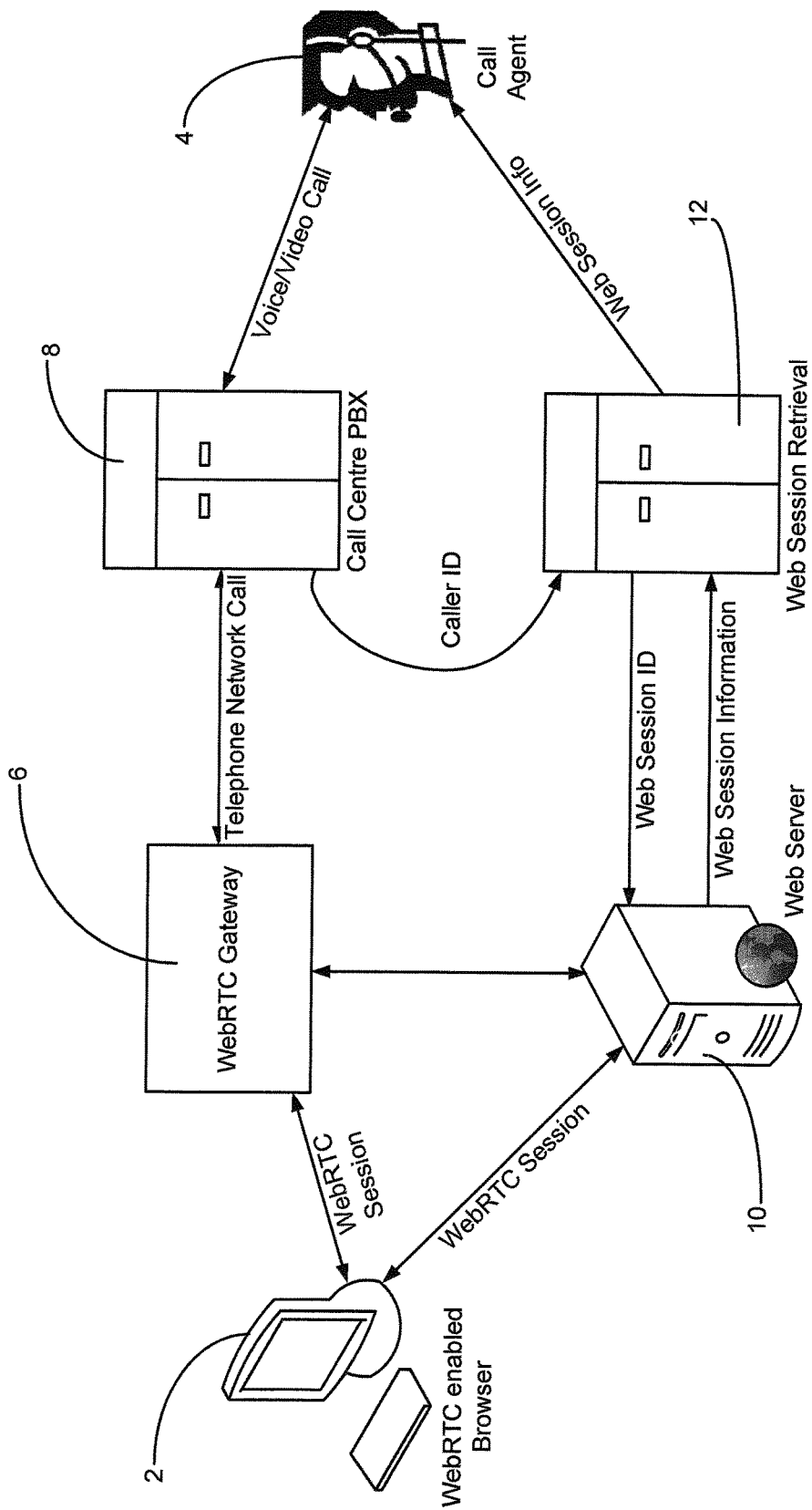

LINKING WEB SESSIONS WITH TELEPHONE CALLS

CROSS REFERENCE TO RELATED APPLICATIONS

The present application claims priority to UK Patent Application No. 1315519.1 filed Aug. 30, 2013, the entirety of the disclosure of which is expressly incorporated herein by reference.

STATEMENT RE: FEDERALLY SPONSORED RESEARCH/DEVELOPMENT

Not Applicable.

FIELD OF THE INVENTION

This invention relates to methods and apparatus for passing web session information from a web browser to a telephony recipient.

BACKGROUND

WebRTC (Web Real-Time Communications) is the name for a new capability incorporated into standards-based web browsers that permits the establishment of real-time, two-way voice and video communications directly from a browser without the need for any additional plug-in software.

With a browser that supports WebRTC, it is possible to develop web applications that enable users to establish voice calls and video calls with other users who have WebRTC-enabled browsers. It is also possible for such a web application to establish voice and video connectivity through suitable gateway functions in the network, thereby enabling users of WebRTC-enabled browsers to establish voice calls and video calls with users in other realms of widely-deployed communications services including public and private fixed and mobile telephone networks and Voice over IP (VoIP) networks. A gateway function embodying this capability is hereinafter referred to as a "WebRTC gateway".

The function of a WebRTC gateway is to communicate between a WebRTC environment, comprising WebRTC-enabled browsers and the web servers with which they communicate, and public or private fixed and mobile telephone networks which may be based on either Time-Division Multiplexed (TDM) technology such as the Public Switched Telephone Network (PSTN) or on packet technology such as Voice over Internet Protocol (VoIP) in conjunction with signalling protocols such as Session Initiation Protocol (SIP).

It is expected that a very common usage of WebRTC will be to support the establishment of voice calls or video calls between a user who is currently viewing a given website on the World-Wide Web, and a call centre that is operated in association with website. Such websites will typically display a button or icon on their pages that, when clicked, will cause the browser to set up a voice call or a video call that is addressed to the call centre.

Call centres are generally equipped with systems that handle incoming calls from telephone networks of various kinds, putting calls into a queue if all agents in the call centre are currently busy, and directing each call, either immediately or from the queue, to an agent who is ready and able to receive a call. Call centre equipment is generally connected to telephone networks of various kinds by standard facilities such as Primary Rate Interface TDM trunks or Session Initiation Protocol (SIP) trunks, and incoming calls are received by the call centre over those facilities.

A user who takes advantage of a WebRTC-enabled browser to establish a voice call or a video call from a web page to a call centre operated in association with the web site hosting that page may have recently visited one or more other pages on the website. They may also have recently entered data into forms presented by the website, or may have recently selected options presented by the website including, for example, selecting products for a planned on-line purchasing transaction. These recent activities constitute a context from within which the call to the call centre or other conventional private or public telephone system, is being established, and this context is typically represented by a collection of state information held in a Web server and referred to hereafter as a "Web session" that can be uniquely identified by a "Web session ID".

A user typically initiates a voice call or a video call to a call centre from a web page in order to ask a question related to or to discuss some aspect of their current activity on the website that hosts that web page. The agent to whom the incoming call from the WebRTC-enabled browser is directed would be able to handle the call more productively if the agent was able to view details of the Web session in which the caller is currently engaged. For example, the agent would not have to ask the caller to state what web page the caller is currently viewing, or to provide information that the caller had previously entered into forms in the context of his or her current Web session, or to provide information about options that the caller had previously selected including items selected for a planned on-line purchasing transaction. With this information visible to the agent, the agent would be able to address the needs of the caller more expeditiously than otherwise, and with greater convenience to the caller.

Voxygen Ltd, London, have disclosed a way of correlating a phone call into a call centre with a Web session associated with the caller. This disclosure is in the form of a case study (eComcall: Next Generation Caller ID) published on the Voxygen website. The concept is claimed to be patented although no published patents or patent applications have presently been found. In this case, the phone call is made from a regular PSTN phone, and the Web session identity is inferred from the called number. The calling number is necessarily that of the physical line from which the call is being made. To implement this system, a large pool of phone numbers is associated with the call centre, and a unique number drawn from this pool is presented to the user who is browsing the business's Web pages. The caller dials the number presented to him on the Web pages, using a conventional telephone, and the call centre can infer the identity of the Web session by examining the called number of the incoming call.

SUMMARY OF THE INVENTION

An object of the invention therefore is to provide the means for a recipient of a call that is originated from a WebRTC-enabled browser and delivered to the recipient over a conventional public or private telephone network (whether TDM-based or packet-based) to identify the Web session that provides the context for the call.

In accordance with the invention, there is provided a method of passing web session information from a web browser to a telephony recipient comprising the steps of, setting up a WebRTC connection between the web browser and the telephony recipient, and encapsulating a web session ID which uniquely identifies a user web session, in at least one call setup message for the WebRTC connection, for transmission to the telephony recipient, whereby the recipient of the WebRTC call is able to identify the web session from which the WebRTC call originates.

In a second aspect, the invention provides a WebRTC application program, executable in a web browser and which when executed, causes the web browser to set up a WebRTC call, to generate a session number that resembles a conventional telephone number and that uniquely identifies a web session from which a WebRTC call originates in use, and to encapsulate the session number in a caller ID field during the WebRTC call setup, for onward transmission to a telephony recipient.

In a third aspect, the invention provides a telephony recipient system, arranged to receive a WebRTC call from a web browser in a web session hosted on a web server, to extract caller ID data from the call, to derive a web session ID from the caller ID data and to retrieve web session state information from the web server and/or web browser dependent on the web session ID.

BRIEF DESCRIPTION OF THE DRAWINGS

Embodiments of the invention will now be described, by way of example, with reference to the drawing in which:—

The FIGURE is a schematic block diagram of a WebRTC and telecommunications system.

DETAILED DESCRIPTION OF THE INVENTION

With reference to the FIGURE, a WebRTC enabled browser 2 is able to set up a WebRTC session with a call centre agent 4, via a WebRTC gateway 6 and a Call Centre PBX 8.

A call delivered over a conventional public or private telephone network, whether it is delivered over Time-Division Multiplexed (TDM) facilities such as ISDN PRI or VoIP facilities such as a SIP trunk, generally contains only two items of identifying information, namely the Called Party Address and the Calling Party Identifier or Caller ID. A call that is originated from a conventional telephone terminal on the PSTN or PLMN may include the Directory Number of that terminal or the Directory Number of some other terminal associated with the caller in the Caller ID, such that the recipient of the call may use this number to establish a call back to the caller. The Caller ID information presented to the called party may instead include an indication that the caller has withheld his or her Directory Number.

When a call is established from a Web page displayed by the WebRTC-enabled browser 2 towards a conventional public or private telephone network 8 (whether TDM-based or VoIP-based) via the WebRTC gateway 6, there is no obvious source of information with which to populate the Caller ID element of the signalling towards the telephone network, since the call is not originating from a conventional telephone terminal of any kind. It would be possible for a Web page displayed by the WebRTC-enabled browser 2 to prompt a user to enter a conventional telephone number at which he or she could be called back, and to convey this information towards the WebRTC gateway 6 where it would be injected into the call setup signalling in the telephone network, as the Caller ID. However, this information, when presented to an agent in the call centre, would not provide the means to identify the Web session in which the user is currently engaged.

Thus instead, a Web application running in web browser 2 or on a web server 10, hosting the website being browsed by the browser 2, assigns a number that resembles a conventional telephone number and that uniquely identifies the current Web session. This number is then injected into the signalling message or signalling messages that flow towards the WebRTC gateway 6. The WebRTC gateway 6 inserts this number into the signalling information element that conveys Caller ID in the signalling message that it sends into the telephone network.

The recipient of the call 4 is then able to refer to the Caller ID information to identify the Web session in which the caller is currently engaged. The recipient 4 may do this manually, for example by reading the Caller ID information presented to the recipient on a Caller ID display and entering it into a user interface presented by a computer system 12 that can retrieve details of the caller's Web session from the Web server 10. Alternatively, the recipient 4 may make use of an automatic system 12 that acts on the Caller ID information signalled with the incoming call, retrieves the details of the Web session from the Web server 10, and presents this to the recipient 4.

The Web application software function that assigns the number that uniquely identifies the caller's current Web session should comply with two specific requirements. Firstly, it must assign a number with a format that is compatible with the capabilities of conventional telephone networks for conveying Caller ID information, and secondly, it should assign a number in such a way that the recipient 4 who receives the number presented as Caller ID information is able unambiguously to identify the number as one that instead identifies a Web session associated with the caller rather than one that identifies a telephone terminal associated with the caller. In North America, it may be possible to meet both of these needs by assigning numbers that belong to an unused area code, for example in the format 853-NXX-XXXX.

It may be possible to upgrade call centre equipment 8 to handle incoming calls directly from WebRTC browsers 2 over the public Internet in which case the gateway 6 described above would not be required. In most cases, however, it will be simpler to deploy a WebRTC gateway function in the Internet that connects calls from WebRTC browsers into one or more existing telephone networks, and then direct those calls to the call centre over the existing facilities, thus allowing the invention to be used with legacy equipment.

What is claimed is:

1. A method of passing web session information from a web browser to a telephony recipient comprising the steps of:— setting up a call between the web browser and the telephony recipient using Web Real-time Communications (WebRTC);

generating a web session ID that resembles a conventional telephone number and that uniquely identifies a user web session of said web browser;

and encapsulating the web session identity (ID) in at least one call setup message for the WebRTC connection, for transmission to the telephony recipient, whereby the recipient of the call is able to extract the web session ID to identify the user web session from which the WebRTC call originates.

2. A method as claimed in claim 1, further comprising communicating with a web server which hosts the user web session in order to derive further information about the web session which is referenced by the web session ID.

3. A method as claimed in claim 1, further including encapsulating the web session ID in a caller party identifier or caller ID field of the said WebRTC setup message.

4. A method as claimed in claim 2, further including encapsulating the web session ID in a caller party identifier or caller ID field of the said WebRTC setup message.

5. A method as claimed in claim 1, wherein the web session ID is created by the web browser.

6. A method as claimed in claim 2, wherein the web session ID is created by the web browser.

7. A method as claimed in claim 3, wherein the web session ID is created by the web browser.

8. A method as claimed in claim 4, wherein the web session ID is created by the web browser.

9. A method as claimed in claim 1, wherein the web session ID is created by the web server.

10. A method as claimed in claim 2, wherein the web session ID is created by the web server.

11. A method as claimed in claim 3, wherein the web session ID is created by the web server.

12. A method as claimed in claim 4, wherein the web session ID is created by the web server.

13. A non-transitory computer medium carrying computer code executable in a web browser and which when executed, causes the web browser; to establish a call to a telephony recipient using Web Real-time Communications (WebRTC), to generate a session number that resembles a conventional telephone number and that uniquely identifies a web session from which the call originates in use, and to, encapsulate the session number in a caller identity (ID) field during the call setup, for onward transmission to the telephony recipient.

14. A telephony recipient system, comprising: a telecommunications device arranged to receive a call established using Web Real-time Communications (WebRTC) from a computer running a web browser to display a web session hosted on a web server; an identity (ID) extractor arranged to extract caller ID data from the call, to derive a web session ID from the caller ID data; and a session state information retriever arranged to retrieve web session state information from the web server and/or web browser dependent on the web session ID.

15. A non-transitory computer readable medium carrying computer code executable on a telephony recipient system, and which when executed on the telephony recipient system, causes the telephony recipient system; to receive a call established using Web Real-time Communications (WebRTC) from a web browser in a web session hosted on a web server, to extract caller ID data from the call, to derive a web session ID from the caller ID data and to retrieve web session state information from the web server and/or web browser dependent on the web session ID.

* * * * *